(No Model.)  4 Sheets—Sheet 3.

A. BOUCHER.
STEAM MOVED STOP AND REDUCING VALVE.

No. 538,765.  Patented May 7, 1895.

Witnesses
F. H. Schott
A. J. Birney

Inventor
Alexandre Boucher
By Chas. J. Hedrick
his attorney

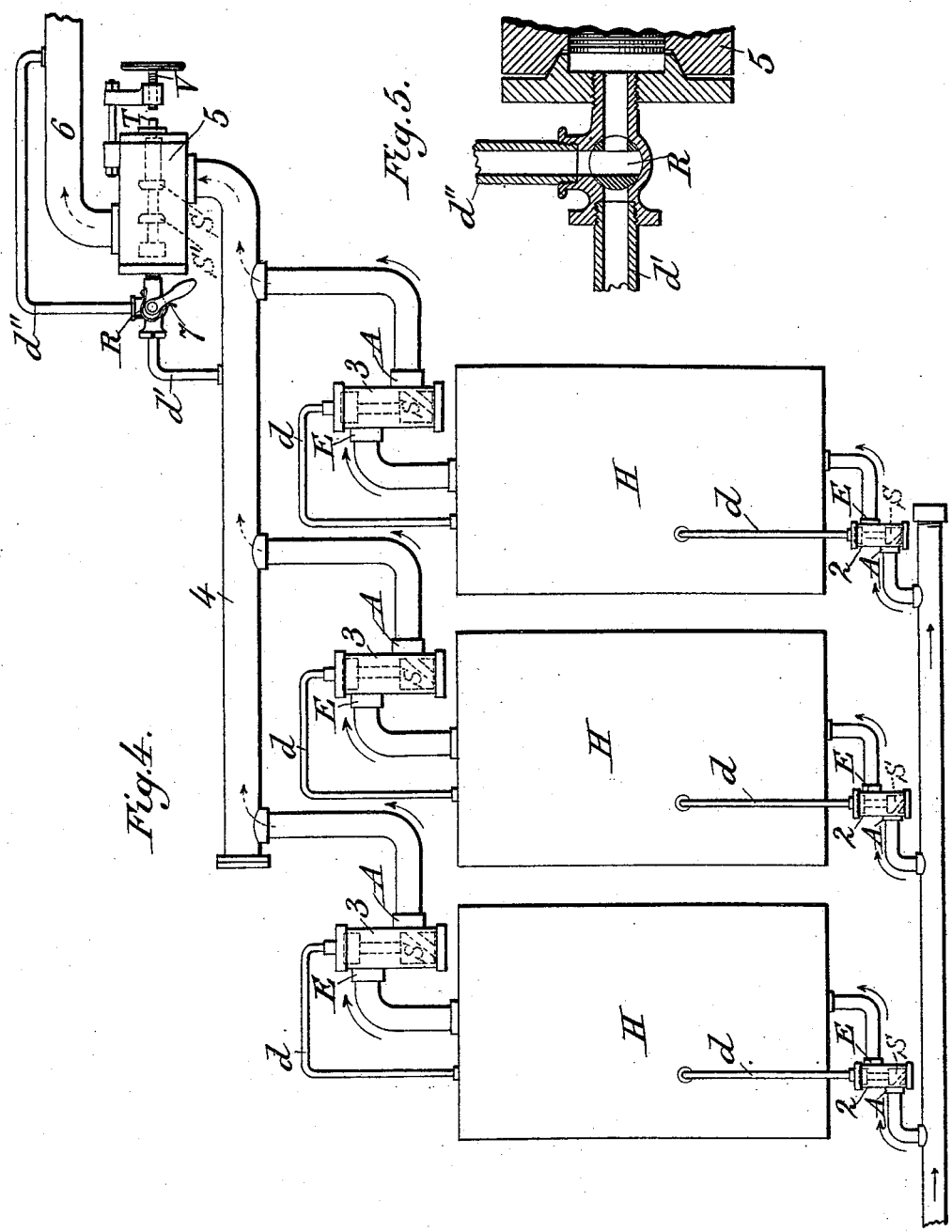

UNITED STATES PATENT OFFICE.

ALEXANDRE BOUCHER, OF HAVRE, FRANCE.

STEAM-MOVED STOP AND REDUCING VALVE.

SPECIFICATION forming part of Letters Patent No. 538,765, dated May 7, 1895.

Application filed July 3, 1894. Serial No. 516,432. (No model.)

*To all whom it may concern:*

Be it known that I, ALEXANDRE BOUCHER, a citizen of France, and a resident of Havre, in the Department of the Seine-Inférieure, France, have invented a new and useful Improvement in Steam-Moved Stop and Reducing Valves, of which the following is a specification.

The improved piston valve forming the subject of this invention is arranged to open and close, as required, through the effect of the pressure of the fluid exercised upon the pipes or conduits which such valve is arranged to control. This pressure of the fluid may be exercised either in the direction in which the valve opens or in that in which it closes; or it may be caused to take place in both directions alternately, the sum of energy expended in one direction being, as the case may be, greater or less than, or equal to, the sum of energy brought into action in the opposite direction. The pressure, whether exercised in one direction or the other, may act on the valve direct, or through the medium of a piston or pistons arranged upon the valve rod which passes through the center of the valve. The valve rod may carry one valve or more than one valve. According to the particular construction of valve, adopted in any given case, the valve may be employed for either opening or closing, accelerating or retarding, the passage of the fluid under pressure. As the opening and closing movements or strokes of the valve depend on the pressure of the fluid, the screw which is employed in certain cases to operate the valve through the medium of its rod, should merely be placed in contact with the end of the said rod, instead of being secured to it. Owing to the automatic operation of the valve, it will prove serviceable in cutting off the supply of fluid under pressure, should the conduit or pipe in which the valve is fitted be ruptured the closing of the valve taking place instantaneously when rupture occurs.

The following are examples serving to explain the nature and illustrate the application of valves in accordance with this invention. They are applicable to multitubular boilers and to steam pipes or conduits generally, or to other containers or pipes or passages subjected to pressure and the improved construction and operation will be best understood by reference to the accompanying drawings, in which—

Figure 1:
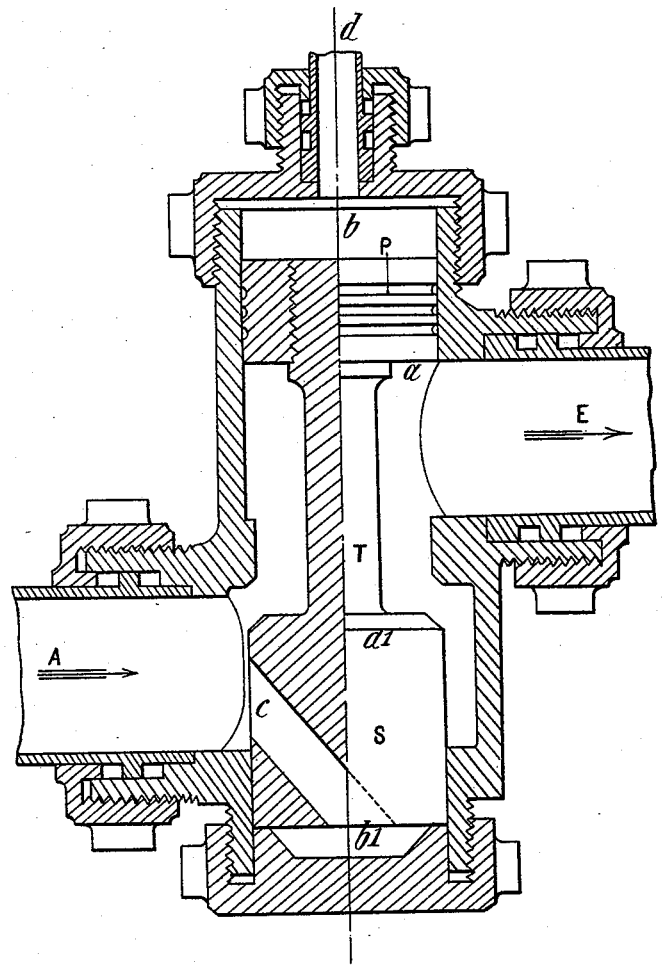
Figure 2:
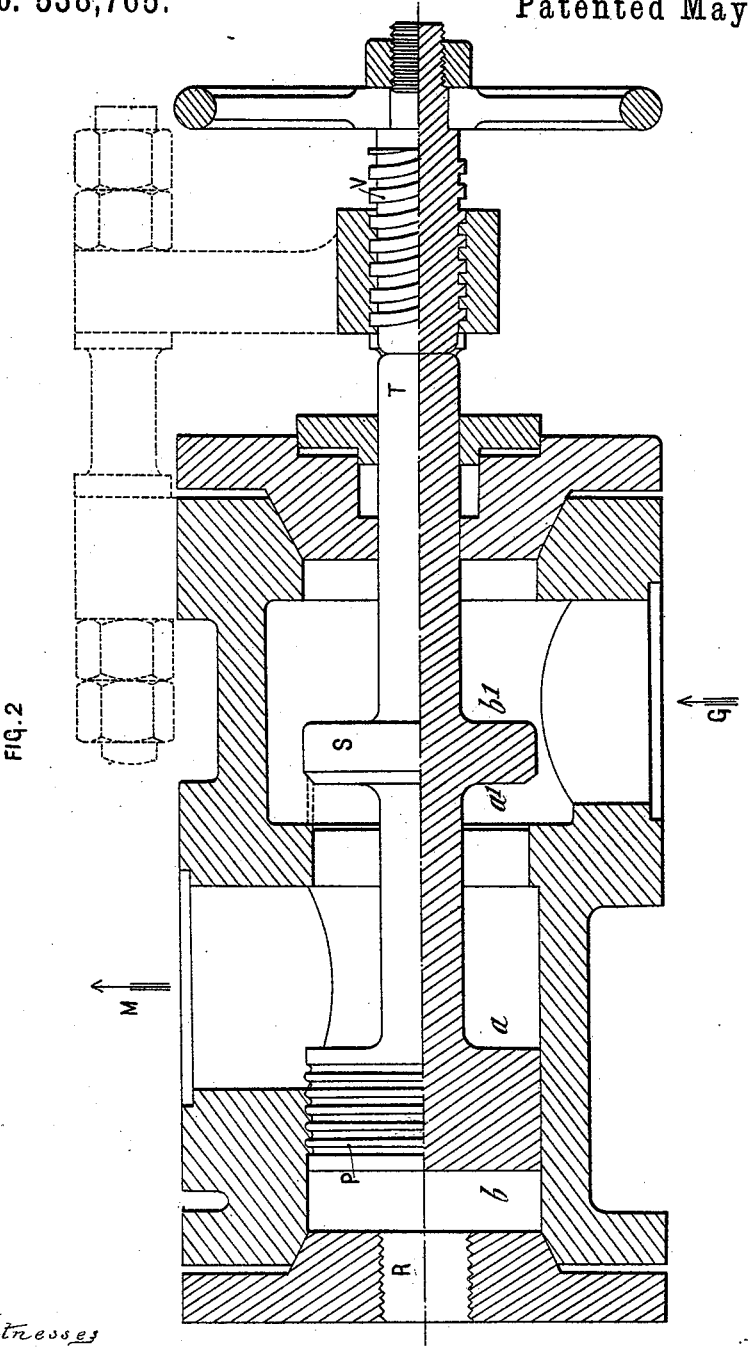
Figure 3:
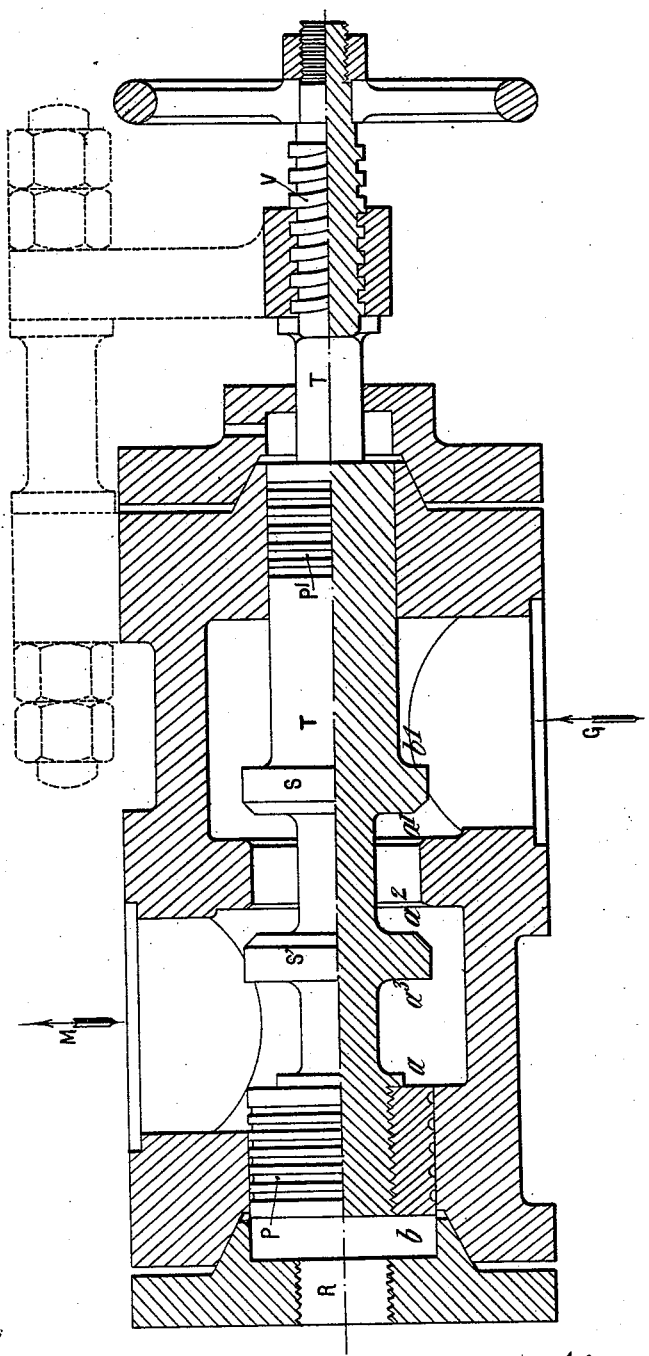

Figures 1, 2, and 3 are axial longitudinal sections of three different forms or types of the improved valve, all arranged on the same principle, while Fig. 4 is a diagram showing the valves of Figs. 1 and 3 applied to a group of boilers or boiler-sections, and Fig. 5 a detail showing the three-way cock used with valves of Figs. 2 and 3.

The piston valve shown in Fig. 1 is adapted for use in multi-tubular steam boilers, consisting of more than one section or series of tubes, each separate from or independent of the other or others, their object being, whenever any serious leakage occurs, or when any one of the tubes happens to be ruptured the section wherein the accident has occurred is completely isolated from the feed water pipe common to all the boiler sections, or from the chamber arranged to collect the steam jointly produced by all the said sections, as the case may be. Thus referring to diagram (Fig. 4) a valve 2 of this description and small dimensions is placed in the water supply pipe of each boiler section H and a similar valve 3 in the discharge pipe through which the steam produced in such section is conducted into the steam reservoir or manifold 4 which collects the steam from all the sections.

The valves 2 and 3 are each constructed as shown in Fig. 1, the valve S forming a piston and its rod integral with the valve carrying another piston P. This latter is subjected to the pressure of fluid introduced into the upper end of the valve chamber through the special conduit or channel $d$.

Each of the valves 2 is supposed to be fixed to the feed water pipe on one side of the orifice A, the orifice E, being the inlet or entrance to the corresponding boiler section, with which the special conduit or channel $d$ is also connected. The valve rod is vertical, the piston S, also forming a valve, being situated below. The valve, consequently, remains open owing to its own weight, and in order to insure the requisite stability of such opening, the said lower piston is arranged to rest with its lower surface upon a narrow annular seat, with the result that the area of this lower piston surface, which is subjected to pressure, is somewhat reduced, and made less than the corresponding area of the upper surface of the top piston, the diameter of the top and bottom piston surfaces being however equal. Owing to this equality of the diameters of the respective pistons, their surfaces $a\ a'$, facing each other, sustain equal pressures at the same time, and, so long as the pressures acting on the surfaces $b\ b'$ respectively, are equal, the valve will remain open and admit feed water into the corresponding element; but as soon as $b$ or the upper piston is relieved from pressure (as for example from a rupture of the boiler section), while the surface $b'$ of the lower piston S, continues under pressure, the pistons will rise and cause the valve to close, so that the supply of water to the said section is for the time being effectually stopped. The lower surface $b'$ of the bottom piston S communicates with the pipe or orifice A by a port $c$ traversing the said piston S and the top surface $b$ of the upper piston communicating with the interior of the boiler section through a tube $d$ of rather small diameter, which should preferably be secured to the corresponding boiler section at a point as nearly as possible approaching the center thereof.

The rod T of the valve may be extended in the downward direction beyond the bottom piston S, and be made to pass through a stuffing box and out of the valve-chest, so that its end may be visible to, and within reach of, the engine driver or stoker, who is thereby enabled at any time to ascertain whether the valve is in proper working order or whether the boiler section to which it belongs is damaged.

Each of valves 3 is placed in the steam discharge pipe, of a boiler section, the orifice E of Fig. 1 being in communication with the steam space of the boiler section and the orifice A with steam reservoir 4, and the tube $d$ with the boiler section. The rod of the valve is arranged vertically with the valve S at its lower end. The weight of the valve will also tend in this case to keep it open. The arrows in Fig. 1 show the flow of the water through the valves when placed at 2 in the feed water pipes; as when placed at 3 in the steam discharge pipe, the steam would (in the normal operation) enter at the orifice E and leave at that marked A in Fig. 1. The lower surface of the bottom piston thus sustains the pressure existing within the steam reservoir or manifold 4, while the upper surface of the top piston, communicating with the boiler section is subjected to the pressure prevailing within that section. Both these pressures are equal, while the steam boiler is in normal operation, with the valve open; but should, by any accident occurring in the boiler section, the top piston happen to be relieved from pressure, the pressure which acts upon the lower piston would instantly cause the valve to close, thereby preventing the current of steam from being reversed, or, in other words, the steam from leaving the reservoir. It will therefore be seen that the employment of the improved valve enables the injurious consequences of a breakage happening in any one section of a multi-tubular boiler to be still further obviated by restraining the steam and water from too abruptly escaping, and reducing the quantities of either, that do escape, to a minimum.

The piston valve shown in Fig. 2 is adapted to be fitted to the outlet of a steam boiler, i. e., at the point from which starts the steam pipe leading to the engine, with a view to immediately cutting off the supply of steam from the boiler to the engine, should the pipe burst or a serious leakage occur in any part thereof. A suitable position in the diagram Fig. 4 would be at 5 the orifice G being in communication with the steam reservoir or manifold 4 and the orifice M with the engine pipe 6, and the chamber back of the surface $b$ by the tube $d'$ or $d''$ with the steam reservoir 4 or the engine pipe 6, according to the position of the three way cock R. The valve 5 embodies further improvements as illustrated in Fig. 3 and hereinafter described with reference thereto, but if such further functions are not desired it could be replaced by the arrangement of Fig. 2. In this form of valve, the valve rod carries a piston P at one end, the diameter of which piston is equal to that of the main valve S; while the other end of the said valve rod is simply in contact with an abutting screw V which may be employed for retaining the valve upon its seat. The steam derived from the boiler enters through the orifice G and issues through the orifice M. As the pressures to which the surfaces $a\ a'$ of the valve and piston, respectively, are submitted, compensate or balance each other, the opening or closing strokes of the valve are necessarily dependent upon the pressures exercised by the steam on the respective surfaces $b\ b'$ of the valve and piston. The pressure so exerted on the surface $b'$ of the valve is of course that of the steam contained in the boiler, but the pressure so exerted on the surface $b$ of the piston may be either the steam pressure existing in the boiler or the steam pressure existing in the pipe or conduit leading to the machine, according as the space at the back of the piston communicates with the boiler or the said conduit, there being provided, for this purpose, a three-way cock, at R, upon the valve-chest, the plug of which cock is submitted to the action of a spring 7, but arranged to remain in place of its own accord, in that position shown in Fig. 5, which places the space next the surface $b$ of the piston in communication with the steam conduit or pipe. It will therefore be understood that when the valve S is closed, being pressed upon its seat by the steam admitted through the orifice G, if the cock R be turned to put the surface $b$ in communication with the boiler and the screw V is turned to release the valve S, the boiler pressure will cause the valve to open as fast as the screw is withdrawn. The end T of the valve-rod, emerging from the chest or case thereof, through a stuffing box, will notify the attendant whether it is in working order or not, by either remaining in contact with, or moving away from, the screw V. By leaving the hand upon the plug of the cock R until the valve S is open by the gradual unscrewing of the screw V, equal steam pressure will be provided for both in the boiler and pipe, after which, by releasing the plug of the cock, the surface $b$ of the piston P will be placed in communication with the steam pipe or conduit. The portion or area of the surface $b'$ of the valve S which is subjected to steam pressure, is somewhat smaller than the corresponding area of the surface $b$ of the piston, and therefore this surface, when placed in communication with the boiler will be submitted to sufficient pressure to bring about the opening of the valve. The difference between these respective areas is equal to the sectional area of the valve rod, and it should be so proportioned that the valve may readily open and that, when open, it should constantly tend to open to a still greater extent, as the loosening of the screw is continued beyond the point determined for the maximum useful or desirable opening. Should it so happen that, after the free passage of the steam through the orifice of the valve has been provided for, the steam pipe should burst or break, the pressure which till then has been sustained by the surface $b$ of the piston P will disappear, and consequently the valve S will close owing to the steam pressure in the boiler continuing to act upon the surface $b'$ of the piston. Thus it will be seen that the consequences of any leakage which accidents of this nature may produce will be rendered far less serious than would otherwise be the case, the steam and water contained in the boiler being effectually prevented from escaping to any considerable extent into the heating chambers and engine room. This valve should, in the case of each boiler of the same group or series, occupy such a position, and its orifices, should be so directed, that in case of an accident occurring in any one of such boilers, none of the steam or water of the other boilers of the same series may escape through the damaged boiler.

The piston valve represented in Fig. 3 is also intended to be arranged at the steam outlet of a boiler, or, in other words, at a point whence the steam pipe leading to the engine starts. Its primary object, as in the preceding arrangement, is to cut off the steam current issuing from the boiler, in case of any accident occuring in the steam pipe or conduit connecting such boiler with the engine; and in addition to that, it is adapted to do duty as an expansion governor. In this valve, the rod of the valve S carries also a second valve S', equal to the first in diameter, but having its closing and opening orifice directed to the opposite side. In addition to these two valves, the said rod carries a piston P. The sectional area of the rod T is so calculated that the area or portion of the surface $b'$ of the valve, whereon the steam exercises its pressure, is in such a relation or ratio to the area of the surface $b$ of the piston P, as is required to exist between the pressure in the steam boiler and the pressure exercised by the steam in the connecting pipe, beyond the valve. The surfaces $a$ $a^3$, as also the surfaces $a'$ $a^2$ of the valves S S' and piston P, respectively, are, every pair of them, equal in area, so that the pressure they sustain will be exactly balanced, and therefore the opening and closing strokes of the two valves must depend upon the pressures exercised by the steam, respectively, upon the surfaces $b$ $b'$ of the valve S and piston P. When therefore the valve S is opened, to the extent shown in Fig. 3 and the chamber back of the surface $b$ is put in communication with the conduit or pipe 6 through the tube $d''$ as before described with reference to the valve of Fig. 2, the screw V should be further turned so as to leave a space (as indicated in Fig. 4) between it and the end of the rod T in order that the valve S' may be free to seat itself. Assuming that the respective areas of the surfaces $b$ and $b'$ are in the ratio of two to one, the results obtained will be as follows:

First. The valve S' will close as soon as the pressure exercised upon the surface $b$ of the piston exceeds one half of the boiler pressure, exercised upon the surface $b'$ of the valve S, and the valve will of its own accord reopen when the pressure exercised upon the surface $b$ of the piston P, $i.$ $e.$, the pressure in the steam conduit, represents the desired fraction of the pressure exercised upon the surface $b'$ of the valve S (that is to say one half of the boiler pressure in the present instance).

Second. The valve S will close whenever in consequence of any accident occurring in the steam conduit or connecting pipe, the pressure of the steam is prevented from acting upon the surface $b$ of the piston P.

Third. The valve S' will close and stay closed under the pressure in pipe 6 whenever the pressure of steam on the surface $b'$ is stopped, as by an accident.

It is evident therefore that the double valve of Fig. 3, is capable of acting as an automatic stop valve in both directions—that is to say, in case of a rupture of the pipe on either side of said valve, it will close automatically in consequence of the pressure on the other side. Such a double acting valve is believed to be entirely new; as is also a fluid-moved double valve adapted to serve both as a stop and pressure reducing valve. It is not, however, broadly new to provide a single fluid-moved valve which is exposed to pressure tending to move the same in one direction and held in place against such pressure by other counteracting pressure of fluid against a piston or the like; but all such prior valves had, so far as I am aware, the counteracting pressure chamber separate from the valve chamber and the piston connected with the valve by means of a rod passing through a stuffing box. I have improved and simplified such valves by forming the counteracting pressure chamber as a continuation of the valve chamber and separating them by the interposition of the piston. This improvement and simplification I have also applied to double valves; although as to these valves, claims are also made of broader scope.

Broad claim is also made to the use of tubes or pipe connections for conveying the fluid pressure to the counteracting pressure chamber from either side of the valve or valves.

Having now particularly described and ascertained the nature of my said invention and in what manner the same is to be performed, I declare that what I claim is—

1. A valve apparatus for enabling the connection with each other of boilers or conduits to be opened, closed or controlled automatically as explained, the said apparatus being composed of a chamber interposed between the tubes or conduits, a valve or valves for opening, closing or controlling the passage through said chamber, a pressure chamber formed as a continuation of the first named chamber and separated therefrom by a movable part (such as a piston) connected with said valve or valves and also having a special pressure fluid conduit or channel, substantially as described.

2. As means for automatically isolating a damaged element of a group of boilers or boiler sections, valve apparatus composed of a chamber fitted in the water inlet or steam outlet pipe of the boilers or boiler sections, a valve arranged to close the passage through such chamber when said valve is operated, and a pressure chamber formed as a continuation of the first named chamber and separated therefrom by a movable part (such as a piston) connected with said valve and also having a special conduit or channel leading from the boiler or boiler section, substantially as described.

3. As means for automatically shutting the steam off from a damaged tube or conduit, valve apparatus composed of a chamber in communication on opposite sides with the steam outlet of a boiler and the tube or conduit damage to which is to be guarded against, a valve arranged to close the passage through such chamber when said valve is operated, and a pressure chamber formed as a continuation of the first named chamber and separated therefrom by a movable part (such as a piston) connected with said valve and also having a special conduit or channel leading from the before mentioned tube or conduit, substantially as described.

4. As means for automatically shutting off the steam from a damaged tube or conduit while at the same time acting as an expansion governor, valve apparatus composed of a chamber in communication on opposite sides with the steam outlet of a boiler and the tube or conduit damage to which is to be guarded against and the pressure in which is to be controlled by the apparatus acting as an expansion governor, valves movable together to close or contract the passage through such chamber when said valves are operated whichever way they may be moved, and having a surface exposed to the fluid for moving the same in one direction, and a counteracting pressure chamber having a movable part connected with said valves and also having a special pipe or channel leading from the said pipe or conduit, substantially as described.

5. A valve apparatus composed of a valve chamber, valves movable together to close or contract the passage through said chamber whichever way they may be moved and having a surface exposed to the fluid for moving the same in one direction, and a counteracting pressure chamber having a movable part (such as a piston) connected with said valves for moving them in the opposite direction, substantially as described.

6. The combination with a valve apparatus composed of a valve chamber, a valve or valves having a surface exposed to the fluid for moving the valve or valves and a counteracting pressure chamber having a movable part (such as a piston) connected with valve or valves, of valved tubes connected with said counteracting pressure chamber on the same side of said movable part or piston for conducting the fluid from either side of said valve or valves to said counteracting pressure chamber, substantially as described.

In testimony whereof I have signed this specification in the presence of two subscribing witnesses.

ALEXANDRE BOUCHER.

Witnesses:
EDWARD P. MACLEAN,
HYPPOLYTE TONE.